Feb. 3, 1942.  W. H. LINGLE  2,272,124
SEAT STRUCTURE
Filed Feb. 9, 1939   3 Sheets-Sheet 1
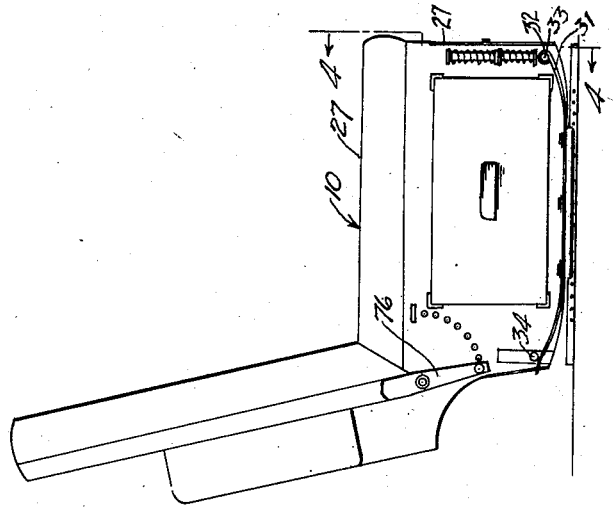
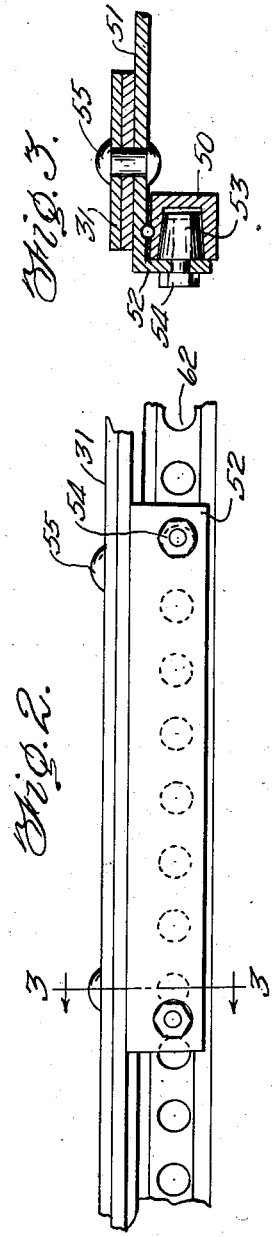
Inventor
WILLIAM H. LINGLE,
By Kimmel & Crowell
Attorneys

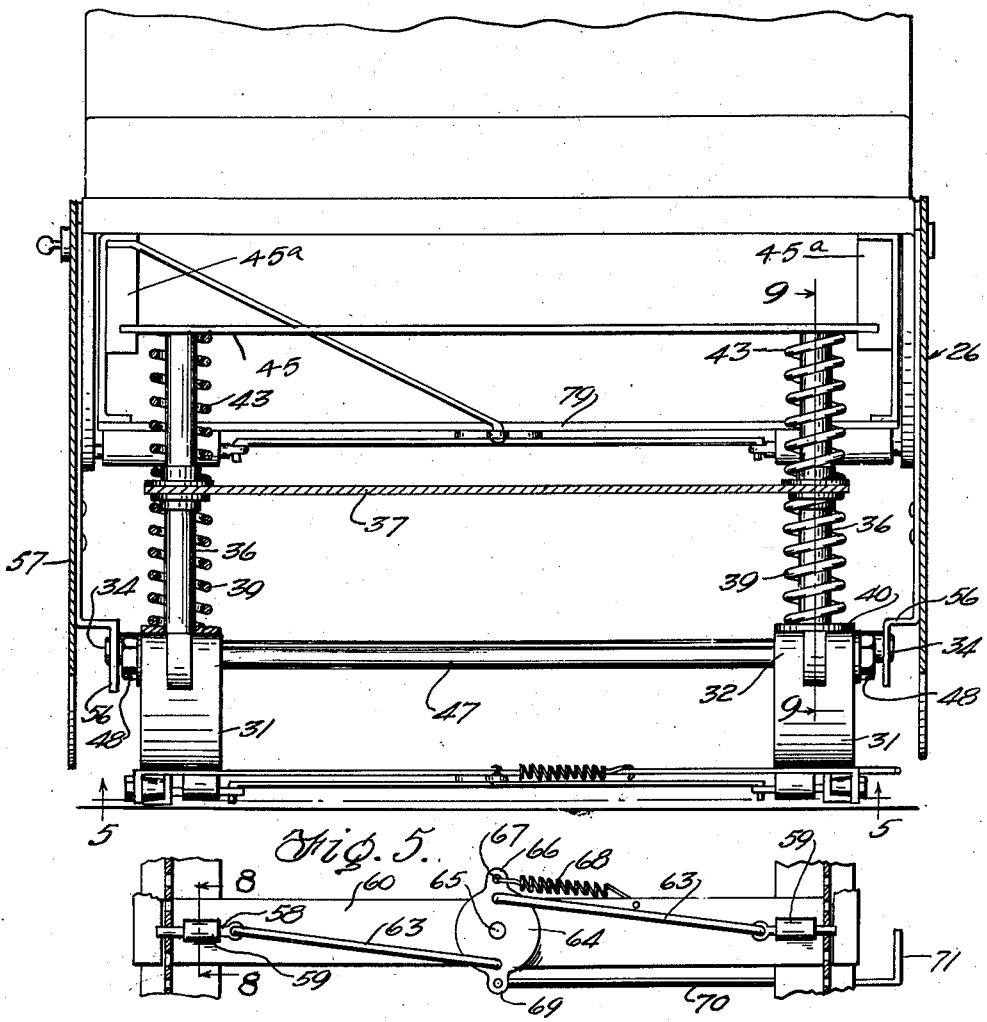

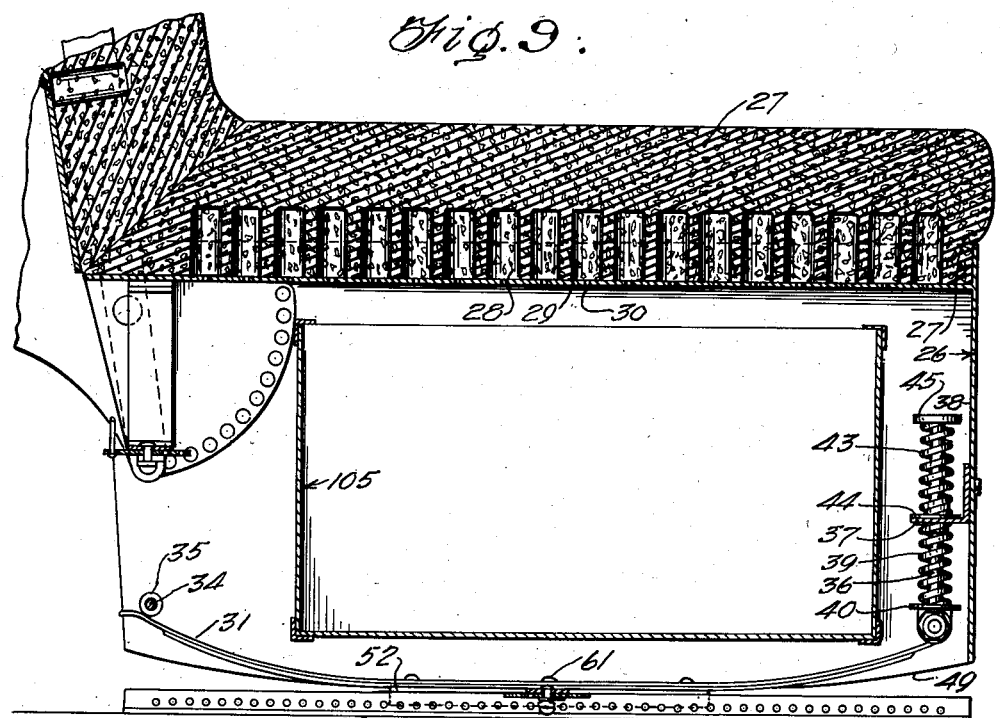
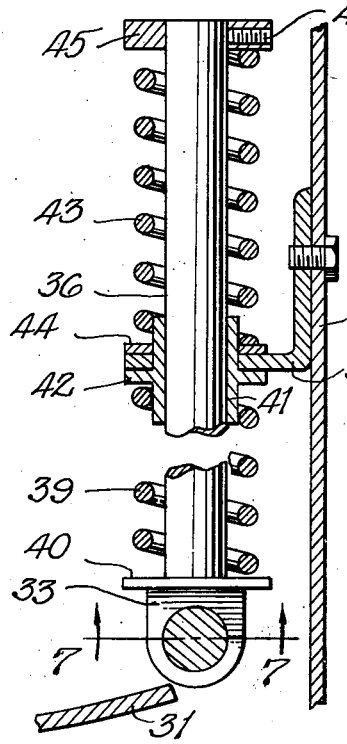
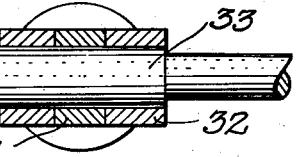
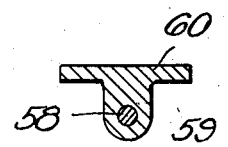

Patented Feb. 3, 1942

2,272,124

UNITED STATES PATENT OFFICE 2,272,124

SEAT STRUCTURE

William H. Lingle, Flint, Mich.

Application February 9, 1939, Serial No. 255,520

6 Claims. (Cl. 155—14)

This invention relates to seat structures and more particularly to an improved seat for use in motor vehicles.

An object of this invention is to provide an improved seat structure for a motor vehicle which is so constructed that the seat may be readily adjusted to meet the convenience of the operator of the vehicle and the seat structure also includes an improved seat which may be adjusted in a manner whereby it may be used for sleeping purposes.

Another object of this invention is to provide an improved seat structure and particularly a front seat structure which is so constructed that the seat may be easily and quickly adjusted longitudinally of the vehicle, the seat structure also including yieldable supporting means therefor.

A further object of this invention is to provide an improved front seat structure wherein the back of the seat may be adjusted to suit the convenience of the driver of the vehicle.

A still further object of this invention is to provide in an adjustable vehicle seat structure an improved cushioning means for the seat.

To the foregoing objects and to other objects which may hereinafter appear, the invention consists of the novel construction, combination and arrangement of parts as will be more specifically referred to and illustrated in the accompanying drawings, wherein are disclosed embodiments of this invention, but it is to be understood that changes, variations and modifications may be resorted to which fall within the scope of the invention as claimed.

In the drawings:

Figure 1 is a detail side elevation of a seat structure constructed according to an embodiment of this invention, a portion of the side wall of the seat being removed, Figure 2 is a fragmentary top plan of the guide rail for the seat, Figure 3 is a sectional view taken on the line 3—3 of Figure 2, Figure 4 is a sectional view taken on the line 4—4 of Figure 1, Figure 5 is a sectional view taken on the line 5—5 of Figure 4, Figure 6 is a fragmentary sectional view taken on the line 6—6 of Figure 4, Figure 7 a sectional view taken on the line 7—7 of Figure 6, Figure 8 is a sectional view taken on the line 8—8 of Figure 5, Figure 9 is a fragmentary longitudinal section taken through the seat structures shown in Figures 1 and 4.

The seat structure generally indicated at 10 includes a base member 26 having a cushion 27 on the upper end thereof which as shown in Figure 9 is formed of sponge rubber or the like and is provided on the under side with a plurality of air cells or pockets 28. The base member 26 is provided at a point spaced downwardly from the upper end thereof with an upper wall 29 provided with a plurality of vent openings 30 communicating with the cells 28 so that the cushion member 27 may freely flex.

The base member 26 is provided adjacent the opposite ends thereof with an elongated multiple leaf spring 31 which at the forward end thereof is provided with an eye 32 engaging a supporting pin 33. The opposite end of each spring 31 is free and engages underneath an inwardly projecting pin 34 which is fixed to an end wall of the base member 26. Preferably, a roller 35 is carried by the pin 34 so as to facilitate the movement of the free or rear end of the spring 31. The pin 33 is carried by the lower end of a vertically disposed coupling rod 36 which projects upwardly through an angle plate 37 carried by the front wall 38 of the base 26. A spring 39 is interposed between the bracket or angle member 37 and the eye 32 and preferably, a washer 40 is disposed about the bar or shaft 36 at the lower end of the spring 39. A sleeve or cylindrical guide member 41 is disposed about the rod 36 and is provided intermediate the ends thereof with a flange 42 engaging against the under side of the bracket 37. The sleeve 41 projects through the bracket 37 and provides a guide means for the rod 36. The upper end of the spring 39 bears against the flange 42 as shown in Figure 6. A second or equalizing spring 43 is disposed about the rod 36 above the bracket 37 and at its lower end bears against a washer 44 engaging the upper side of the bracket 37. The upper end of the spring 43 bears against a bar 45 which is fixed onto the upper end of the rod 36 and is locked by a set screw or locking member 46. Preferably, the two pins 33 for the springs 31 are connected together by a connecting rod 47 and the opposite ends of the pins 33 are threaded and carry a nut 48 so that the pins 33 and the rod 47 will be held against endwise movement. The bar 45 is notched at the ends thereof and is slidable in guide members 45ᵃ fixed to the base 26.

The hereinbefore described supporting means for the seat 10 will provide a cushioning means for the seat which will permit vertical movement or rocking movement of the seat. As shown in Figure 9 the lower edge of the end walls of the seat base member 26 are of longitudinally arcuate configuration as shown at 49 so that the entire seat structure may be readily rocked forward and backwardly in the event the weight on the seat is sufficient to flex the springs 31.

The base 26 of the seat 10 is adapted to be adjusted longitudinally of the vehicle by means of a pair of U-shaped guide members 50 which are disposed in parallel relation one adjacent each end wall of the seat and are adapted to be fixedly secured to the floor of the vehicle. The base member 26 is provided with a transversely disposed bar 51 having right angularly disposed opposite end portions 52 on which rollers 53 are secured by means of pins or bolts 54. The rollers 53 rotatably engage within the channel formed by the U-shaped tracks or guide members 50. In the present instance, one bar or strip 51 is secured as by fastening members 55 in the form of rivets or the like to the under sides of the springs 31 as shown in Figures 2 and 3.

The spring supporting pins 34 as shown in Figure 4 are preferably carried by a bracket member 56 which is secured by suitable fastening devices to the inner side of an end wall 57 of the base member 26. In this manner the pins 34 will be entirely concealed within the base member 26.

The seat member 10 is locked in adjusted position on the supporting rails 50 by a pair of releasable locking pins 58 which are slidable in bosses 59 carried by a transversely extending bar 60. The bar 60 is fixed by means of rivets or fastening devices 61 to the two springs 31 so that the bar 60 will move with the base 26. The channel member or guide 50 as shown in Figure 2 is provided with a plurality of longitudinally spaced apart openings 62 in which the locking pins 58 are adapted to engage. The two pins 58 which engage the two channels or guide members 50 are operated simultaneously by means of a pair of links 63 which are connected at their outer ends to the locking pins 58 and at their inner ends to a rotatable plate 64. The plate 64 is rotatably carried on a pivot 65 extending through the bar 60 in substantially the longitudinal center of the bar 60. The plate 64 is provided with an ear 66 having an opening 67 in which one end of contracting spring 68 engages. The opposite end of the spring 68 is secured to the bar 60 and normally holds the pins 58 in an extended or locking position. The plate 64 is provided with a second ear 69 diametrically opposite from the ear 66 and a releasing rod or member 70 engages through the ear 69 and is extended beyond one of the guide members 50 and is provided with a handle 71 so that the locking pins 58 may be retracted to a released position in order to permit the base member 26 to be moved longitudinally of the guide members 50.

What I claim is:

1. In a seat structure for use in connection with vehicles, a bodily horizontally adjustable tiltable resiliently supported base for a seat member, a pair of oppositely disposed spaced parallel horizontally extending stationary outwardly opening channel-shaped guides arranged below said base and provided in their inner sides with spaced openings, a slide bar disposed in transverse relation with respect to and arranged below said base, said bar being slidably mounted on and having depending end portions opposing the outer sides of said guide, rollers carried by said end portions and extending into said guides, a pair of elongated concave horizontally disposed multiple leaf springs arranged over and being secured intermediate their ends to said bar in proximity to said end portions, said springs having their terminal portions extending upwardly into said base, rollers carried by said base, arranged over and engageable with the rear terminal portions of said springs, vertically movable spring controlled spaced coupling rods suspended within and from said base and being pivotally connected at their lower ends to the forward ends of said springs, a supporting bar bodily movable with said slide bar, and latching means carried by the supporting bar and correlating with selective openings of said guides for releasably locking the base in its horizontally adjusted position.

2. In a seat structure for use in connection with vehicles, a bodily horizontally adjustable tiltable resiliently supported base for a seat member, a pair of oppositely disposed spaced parallel horizontally extending stationary outwardly opening channel-shaped guides arranged below said base and provided in their inner sides with spaced openings, a slide bar disposed in transverse relation with respect to and arranged below said base, said bar being slidably mounted on and having depending end portions opposing the outer sides of said guides, rollers carried by said end portions and extending into said guides, a pair of elongated concave horizontally disposed multiple leaf springs arranged over and being secured intermediate their ends to said bar in proximity to said end portions, said springs having their terminal portions extending upwardly into said base, rollers carried by said base, arranged over and engageable with the rear terminal portions of said springs, vertically movable spring controlled spaced coupling rods suspended within and from said base and being pivotally connected at their lower ends to the forward ends of said springs, a supporting bar bodily movable with said slide bar, latching means carried by the supporting bar and correlating with selective openings of said guides for releasably locking the base in its horizontally adjusted position, means for coupling said coupling rods together, and equalizing springs for said rods.

3. In a seat structure for use in connection with vehicles, a pair of spaced stationary horizontally disposed parallel guides formed with spaced openings, a slide structure slidably mounted on said guides and having rollers travelling within the guides, a pair of spaced horizontally disposed elongated resilient elements of bow-shaped contour arranged over and being fixed intermediate their ends to said slide structure, a bodily horizontally adjustable base for a seat member, said base being arranged over said guide structure, said elements extending into and engaging with the rear of the base, a vertically movable spring controlled coupling structure suspended in and from said base, means for pivotally connecting the front ends of said elements to the lower end of the coupling structure, and means bodily moving with said slide structure and correlating with selective openings of said guide for releasably locking the base in its horizontally adjusted position.

4. In a seat structure for use in connection with vehicles, a bodily horizontally adjustable base for a seat member, a pair of oppositely disposed spaced horizontally depending stationary outwardly opening channel-shaped guides disposed below the base and formed in their inner sides with spaced openings, a slide bar disposed at right angles to and slidably mounted on said guides, said slide bar having depending end portions opposing the outer sides of said guides, rollers carried by said end portions and extending into said guides, horizontally disposed spaced aligned resilient elements arranged over and being secured intermediate their ends to said bar, said elements having rear terminal portions extending up into and slidably engaging with the rear of said base, vertically movable spring controlled coupling rods suspended in and from the front portion of said base, means for pivotally connecting the forward ends of said elements to the lower ends of said coupling rods, supporting means at the lower portion of the base bodily moving with said slide bar and elements, and a latching structure carried by said supporting means and correlating with selected openings of said guides for releasably securing said base in its horizontally adjustable position.

5. In a seat structure for use in connection with vehicles, a pair of spaced parallel horizontally disposed stationary channel-shaped guides formed with openings, a slide bar slidably mounted on and being provided with rollers travelling in said guides, a bodily horizontally adjustable base for supporting a seat member, a pair of horizontally disposed resilient bow-shaped elements one on each side of the base, arranged over and being fixedly secured intermediate their ends to said bar, said elements slidably engaging at their rear with the rear of said base, a vertically movable spring controlled coupling structure within and suspended by the base and having the lower end thereof pivotally connected to the forward ends of said elements, a supporting means bodily moving with said bar and elements, and a latching structure carried by said supporting means and correlating with selected openings in said guides for releasably securing said base in its horizontally adjusted position.

6. In a seat structure for use in connection with vehicles, a pair of spaced parallel horizontally disposed stationary channel-shaped guides formed with openings, a slide bar slidably mounted on and being provided with rollers travelling in said guides, a bodily horizontally adjustable base for supporting a seat member, a pair of horizontally disposed resilient bow-shaped elements one on each side of the base, arranged over and being fixedly secured intermediate their ends to said bar, said elements slidably engaging at their rear with the rear of said base, a vertically movable spring controlled coupling structure within and suspended by the base and having the lower end thereof pivotally connected to the forward ends of said element, a supporting means bodily moving with said bar and element, and a latching structure carried by said supporting means and correlating with selected openings in said guides for releasably securing said base in its horizontally adjusted position, the said coupling structure including equalizing means therefor.

WILLIAM H. LINGLE.